US011983726B2

(12) United States Patent
Chen et al.

(10) Patent No.: US 11,983,726 B2
(45) Date of Patent: May 14, 2024

(54) CONSUMPTION PREDICTION SYSTEM AND CONSUMPTION PREDICTION METHOD

(71) Applicant: Quanta Computer Inc., Taoyuan (TW)

(72) Inventors: Wen-Kuang Chen, Taoyuan (TW); Chien-Kuo Hung, Taoyuan (TW); Chun-Hung Chen, Taoyuan (TW); Chen-Chung Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 934 days.

(21) Appl. No.: 17/000,681

(22) Filed: Aug. 24, 2020

(65) Prior Publication Data

US 2021/0303996 A1    Sep. 30, 2021

(30) Foreign Application Priority Data

Mar. 31, 2020  (TW) .................................. 109110919

(51) Int. Cl.
*G06Q 30/02* (2023.01)
*G06Q 30/0202* (2023.01)
(Continued)

(52) U.S. Cl.
CPC ....... *G06Q 30/0202* (2013.01); *G06V 10/454* (2022.01); *G06V 10/764* (2022.01); *G06V 10/82* (2022.01); *G06Q 50/12* (2013.01)

(58) Field of Classification Search
CPC . G06Q 30/0202; G06Q 50/12; G06Q 30/0201
See application file for complete search history.

(56) References Cited

U.S. PATENT DOCUMENTS

2011/0106607 A1*  5/2011  Alfonso ................. G06Q 30/02
                                                              705/35
2017/0004404 A1*  1/2017  Fujimura ............... G06N 20/00
(Continued)

FOREIGN PATENT DOCUMENTS

| CN | 109509030 A | 3/2019 |
| CN | 110443314 A | 11/2019 |
| CN | 110580639 A | 12/2019 |

OTHER PUBLICATIONS

"An Improved Demand Forecasting Model Using Deep Learning Approach and Proposed Decision Integration Strategy for Supply Chain" (Kilimci, Zeynep Hilal et al. Complexity, vol. 2019, Article ID 9067367, 15 pages, 2019. https://doi.org/10.1155/2019/9067367 Published Mar. 26, 2019) (Year: 2019).*

(Continued)

*Primary Examiner* — James M Detweiler
(74) *Attorney, Agent, or Firm* — McClure, Qualey & Rodack, LLP (57) ABSTRACT

A consumption prediction method includes the following steps: calculating a personal preference correlation coefficient; inputting historical environment data, a historical consumption record and the personal preference correlation coefficient into a first neural network model; a training model is generated by the first neural network model; and determining whether the accuracy rate of the training model is higher than the training threshold. When the accuracy rate of the training model is higher than the training threshold, the training model is regarded as a prediction model.

9 Claims, 4 Drawing Sheets

(51) Int. Cl.
*G06V 10/44* (2022.01)
*G06V 10/764* (2022.01)
*G06V 10/82* (2022.01)
G06Q 50/12 (2012.01)

(56) References Cited

U.S. PATENT DOCUMENTS

2017/0169446 A1* 6/2017 Li .................... G06Q 30/0202
2018/0053255 A1* 2/2018 Valdyanathan ....... G06Q 10/067
2019/0102693 A1* 4/2019 Yates .................... G06N 20/00
2020/0134640 A1* 4/2020 Morgan ................. G06N 3/08

OTHER PUBLICATIONS

Chinese language office action dated Mar. 10, 2021, issued in application No. TW 109110919.

* cited by examiner

CONSUMPTION PREDICTION SYSTEM AND CONSUMPTION PREDICTION METHOD

CROSS REFERENCE TO RELATED APPLICATIONS

This application claims priority of Taiwan Patent Application No. 109110919, filed on Mar. 31, 2020, the entirety of which is incorporated by reference herein.

BACKGROUND OF THE INVENTION

Field of the Invention

The present disclosure relates to a consumption prediction system and, in particular, to a consumption prediction system and a consumption prediction method.

Description of the Related Art

In general, sales report analysis can only present past consumption records because the number of guests and daily consumption preferences are difficult to predict accurately. Obtaining a current estimate of the number of guests may use traditional mathematical analyses or rules of thumb. The predictive accuracy of these methods is relatively low, and as a result, the store's daily material preparation cannot be accurately grasped. It is therefore easy for the material to be insufficiently prepared or excessively prepared, which is a waste of material. In addition, even when a variety of historical data is obtained, it is difficult to provide prediction data quickly, because of the human resources used for statistics, or because the use of traditional mathematical analysis requires a large amount of calculations.

Therefore, how to efficiently consider a variety of factors that affect consumption to quickly and accurately predict the number of guests and product sales has become one of the problems to be solved in the field.

BRIEF SUMMARY OF THE INVENTION

In accordance with one feature of the present invention, the present disclosure provides a consumption prediction system. The consumption prediction system includes a data storage device and a processor. The data storage device is configured to store a historical environment data and a historical consumption record. The processor is configured to calculate a personal preference correlation coefficient, and input the historical environment data, the historical consumption record and the personal preference correlation coefficient into a first neural network model. The first neural network model is used to generate a training model. When the accuracy rate of the training model is higher than the training threshold, the training model is regarded as a prediction model; prediction environment data is input into the prediction model, and the prediction model outputs a prediction result based on the prediction environment data; the predicted guest number and the predicted turnover from the prediction result are extracted; the predicted guest number is compared with the actual guest number to generate a guest correction weight; the predicted turnover is compared with the actual turnover to generate a turnover correction weight. The processor determines whether the guest correction weight is higher than a guest weight threshold or whether the turnover correction weight is higher than a turnover weight threshold. When the guest correction weight is higher than the guest weight threshold or the turnover correction weight is higher than the turnover weight threshold, the processor adjusts the training model according to the guest correction weight and the turnover correction weight to update the training model.

In accordance with one feature of the present invention, the present disclosure provides a consumption prediction method. The consumption prediction method includes the following steps: calculating a personal preference correlation coefficient; inputting a historical environment data, a historical consumption record and the personal preference correlation coefficient into a first neural network model; a training model is generated by the first neural network model; and determining whether the accuracy rate of the training model is higher than the training threshold, (wherein when the accuracy rate of the training model is higher than the training threshold, the training model is regarded as a prediction model); inputting prediction environment data into the prediction model, which allows the prediction model to output a prediction result based on the prediction environment data; extracting the predicted guest number and the predicted turnover from the prediction result; comparing the predicted guest number with the actual guest number to generate a guest correction weight; comparing the predicted turnover with the actual turnover to generate a turnover correction weight; and determining whether the guest correction weight is higher than the guest weight threshold, or whether the turnover correction weight is higher than the turnover weight threshold. When the guest correction weight is higher than the guest weight threshold or the turnover correction weight is higher than the turnover weight threshold, the processor adjusts the training model according to the guest correction weight and the turnover correction weight to update the training model.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
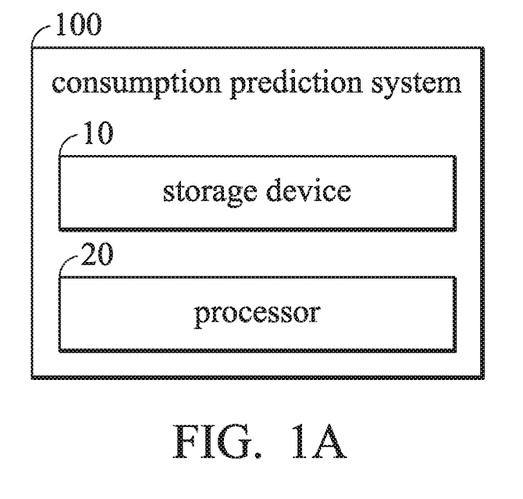
FIG. 1A is a block diagram of a consumption prediction system in accordance with one embodiment of the present disclosure.
Figure 1B:
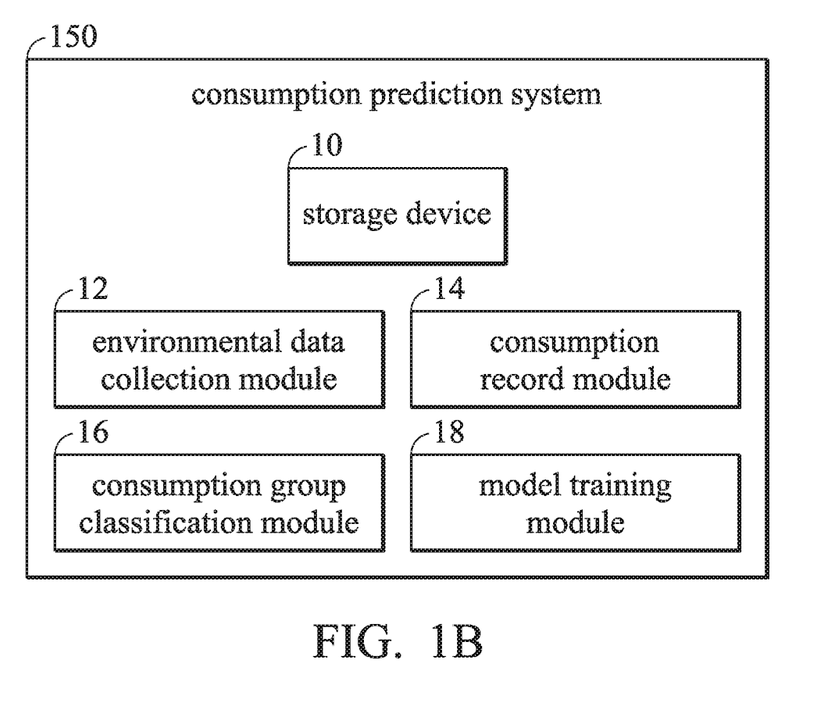
FIG. 1B is a block diagram of a consumption prediction system in accordance with one embodiment of the present disclosure.
Figure 2:
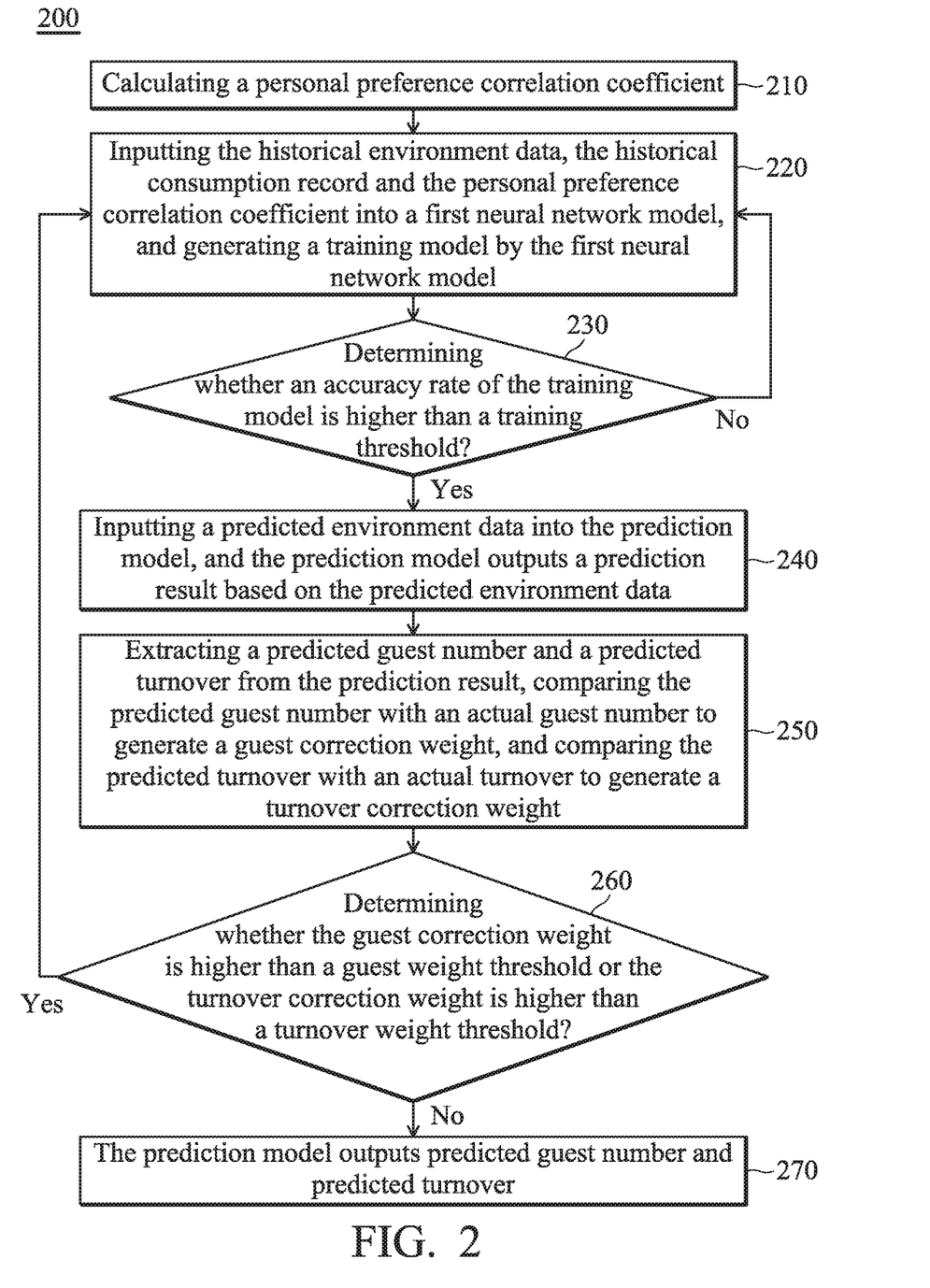
FIG. 2 is a flowchart of a consumption prediction method 200 in accordance with one embodiment of the present disclosure.

FIGS. 1A, 1B and 2, FIG. 1A is a block diagram of a consumption prediction system 100 in accordance with one embodiment of the present disclosure. FIG. 1B is a block diagram of a consumption prediction system 150 in accordance with one embodiment of the present disclosure. FIG. 2 is a flowchart of a consumption prediction method 200 in accordance with one embodiment of the present disclosure.

As shown in FIG. 1A, the consumption prediction system 100 is suitable for an electronic device. The electronic device is, for example, a mobile phone, a tablet, a notebook or other device having calculation function. The consumption prediction system 100 includes a storage device 10 and a processor 20. In one embodiment, the storage device 10 can be implemented as a read-only memory, a flash memory, a floppy disk, a hard disk, a compact disk, a flash drive, a tape, a network accessible database, or as a storage medium that can be easily considered by those skilled in the art to have the same function. In one embodiment, the processor 20 can be implemented by using an integrated circuit, such as a microcontroller, a microprocessor, a digital signal processor, an application specific integrated circuit (ASIC), or a logic circuit. However, it is not limited thereto.

As shown in FIG. 1B, the consumption prediction system 150 is suitable for an electronic device. The electronic device is, for example, a mobile phone, a tablet, a notebook or another device having a calculation function. The consumption prediction system 150 includes a storage device 10, an environmental data collection module 12, a consumption record module 14, a consumption group classification module 16, and a model training module 18. In one embodiment, the environmental data collection module 12, a consumption record module 14, the consumption group classification module 16, and the model training module 18 are each implemented by a hardware circuit, and the environmental data collection module 12, the consumption record module 14, the consumption group classification module 16, and the model training module 18 are each coupled to the processor 20. In one embodiment, the environmental data collection module 12, the consumption record module 14, the consumption group classification module 16, and the model training module 18 are included in the processor 20. In one embodiment, the environmental data collection module 12, the consumption record module 14, the consumption group classification module 16, and the model training module 18 each be implemented by software and executed by the processor 20. In one embodiment, the environmental data collection module 12, the consumption record module 14, the consumption group classification module 16, and the model training module 18 can be implemented together or separately by an integrated circuit such as a micro control unit, a microprocessor, a digital signal processor, a special application integrated circuit or a logic circuit.

The consumption prediction method 200 is described below. The consumption prediction method 200 can be implemented by the consumption prediction system 100 or 150.

In step 210, the processor 20 calculates a personal preference correlation coefficient.

In one embodiment, the processor 20 adds up the number of purchases by a consumer in a specific store in a time interval to obtain a total number of purchases by the consumer in the specific store, and divide the total number of purchases by the consumer in the specific store by the number of purchases by the consumer in all stores in the time interval to calculate the personal preference correlation coefficient. In one embodiment, the formula for calculating the personal preference correlation coefficient is as follows.

$$PAR_{et} = \frac{\sum_{t=1}^{n} R_{et}}{n}$$

The symbol t represents the time interval, such as 7, 15, 30, 60 days . . . etc. The symbol n represents the amount of consumption in all stores at each time point. The symbol e can represent the store, the product type, whether the weather is good or bad, or the discussion popularity—whether high, medium, or low—of the store, etc. It is a variable, and can be substituted into different values, such as the store code, according to the actual application. The symbol R_et represents the number of each store consumption at each time point. The symbol PAR_et is the personal preference correlation coefficient for consumption at the store.

In step 220, the processor 20 inputs the historical environment data, the historical consumption record and the personal preference correlation coefficient into a first neural network model, and the first neural network model is used to generate a training model.

In an embodiment, the first type of neural network model can be implemented by a known convolutional neural network (CNN) model. However, those with ordinary knowledge in the art should understand that the present invention is not limited to the use of CNN models, as long as other neural network models that can achieve automatic classification can be applied.

Figure 3A:
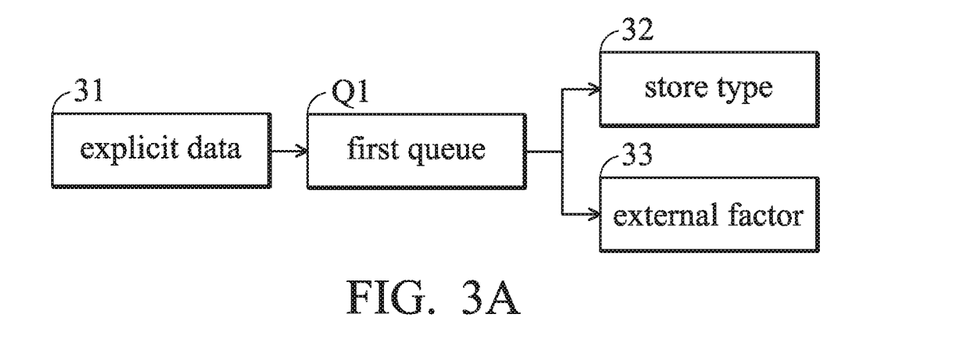
FIGS. 3A-3C are schematic diagrams of environment data collection method in accordance with one embodiment of the present disclosure.
Figure 3B:
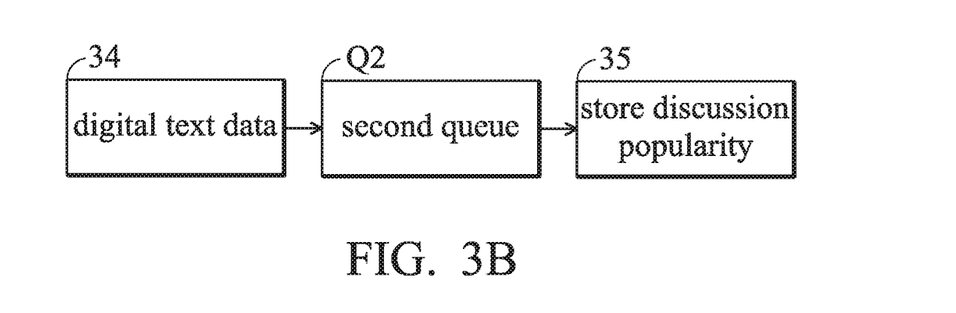
Figure 3C:
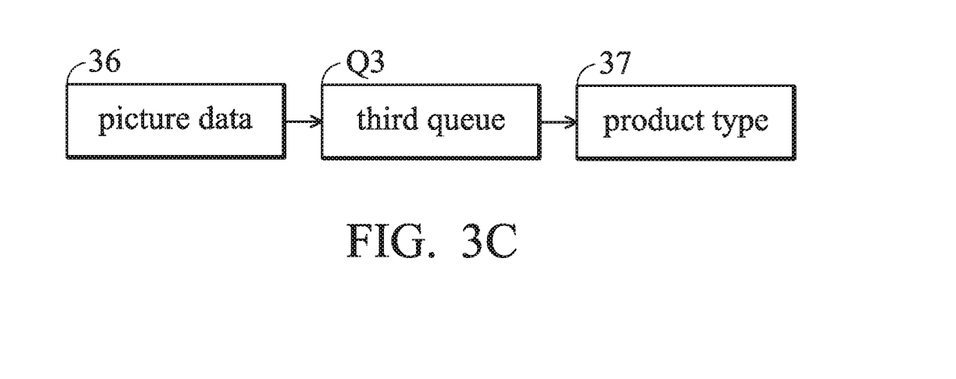

In one embodiment, the historical environment data can be collected by the environmental data collection module 12 or the processor 20. In one embodiment, the environment data collected by the environmental data collection module 12 or the processor 20 can be regarded as historical environment data. In one embodiment, the processor 20 can obtain the environment data from the environmental data collection module 12. Please refer to FIGS. 3A-3C, FIGS. 3A-3C are schematic diagrams of environment data collection method 300 in accordance with one embodiment of the present disclosure. The environment data collection method 300 can be executed by the environmental data collection module 12 or the processor 20. The environment data collection method 300 shown in FIGS. 3A to 3C does not limit the execution order. In addition, the environment data collection method 300 shown in FIGS. 3A to 3C can be executed simultaneously.

In one embodiment, as shown in FIG. 3A, the processor 20 receives a piece of explicit data 31 (e.g., weather, store evaluation, store name), and stores the explicit data 31 to a first queue Q1. The processor 20 reads the explicit data 31 from the first queue Q1 and retrieves a text message in the explicit data 31. The text message is related to store type 32 and an external factor 33. The store type 32 includes store evaluation, store location, traffic information, satisfaction, daily product information and/or activity information, and so on. The external factor 33 includes information such as weather, season, and/or temperature. In one embodiment, user can manually input the explicit data 31 to the consumption prediction system 100 (or 150). In one embodiment, the processor 20 can obtain the explicit data 31 from the network.

In one embodiment, as shown in FIG. 3B, the processor 20 receives a digital text data 34 and stores the digital text data 34 in a second queue Q2. The processor 20 reads the digital text data 34 from the second queue Q2, and classifies the digital text data 34 by a second neural network model to obtain the store-discussion popularity 35 corresponding to the digital text data 34. In one embodiment, the processor 20 can obtain digital text data 34 from the network. The digital text data 34 is, for example, text data in Facebook, Google, Twitter, or email. For example, the processor 20 can search the discussion thread and rating score of a certain store through Google's search engine. The accumulation of these rating scores can be regarded as store-discussion popularity 35.

In one embodiment, the second neural network model can be implemented by a known CNN model. However, those with ordinary knowledge in the art should understand that the present invention is not limited to the use of CNN models, as long as other neural network models that can achieve automatic classification can be applied. More specifically, after the processor 20 reads the digital text data 34 from the second queue Q2, it can use the second neural network model to determine the correctness of the digital text data 34 (for example, to exclude the text in the ad link, only to leave the text in the user evaluation link). The processor 20 then uses the second neural network model to extract the text message. In addition, the processor 20 applies the text message extracted by the second neural network model to give a positive or negative evaluation score. The processor 20 can also use the second neural network model to classify the discussion of store topic in the digital text data 34 to classify the store type (such as snack bar, convenience store, restaurant . . . , etc.). The number of articles corresponding to each store type is regarded as store-discussion popularity 35, and the correlation between the store type theme and the product type 37 can also be determined (for example, there are 1,000 articles in the theme of the buffet restaurant (store type), there is no article mentioning steak (product type 37). Therefore, the type of buffet restaurant is less relevant to steak.)

In one embodiment, as shown in FIG. 3C, the processor 20 receives picture data 36 and stores the picture data 36 to a third queue Q3. The processor 20 reads out the picture data 36 from the third queue Q3, and classifies the picture data 36 by a third neural network model to obtain a product type 37 corresponding to the picture data 36. In one embodiment, the user can manually input the picture data 36 to the consumption prediction system 100 (or 150). In one embodiment, the processor 20 can obtain a picture data 36 from the network. In one embodiment, the product type 37 is, for example, vegetarian food, a pork entree, coffee, fruit, etc.

In an embodiment, the third neural network model can be implemented by a known CNN model. However, those with ordinary knowledge in the art will understand that the present invention is not limited to the use of CNN models, as long as other neural network models that can achieve automatic classification can be employed.

In one embodiment, the first queue Q1, the second queue Q2, and the third queue Q3 can be combined into a single queue.

In one embodiment, the environmental data collection module 12 or the processor collects the explicit data 31 and the text content of the social networking site (such as digital text data 34). In terms of collecting explicit data 31, the environmental data collection module 12 or the processor 20 can periodically call the application programming interface (API) of external systems or government agencies to obtain external factors 33, such as the degree of good weather and bad degree, season, working day or not. Based on the information, it is helpful for the processor 20 to predict that the motivation of consumers to choose a merchant for consumption every day. For the general office worker, in addition to special activities, the merchants who prefer to consume may be full of fixed, especially in a private cloud environment, employees and merchants usually do not change much. The explicit data 31 contains the contents of Table 1:

TABLE 1

| date | weather | activity | temperature |
| --- | --- | --- | --- |
| 11/1 | sunny day | No | 27 |
| 11/2 | cloudy day | No | 25 |
| 11/3 | cloudy day | special sale | 26 |

In one embodiment, the explicit data 31 includes store information and service attributes provided by the store, such as main course, store location in the mall, store positive evaluations, supportable collection devices, store negative evaluations, business hours of morning, afternoon, evening, etc. These affect the number of customers going to the store. In addition, some consumers take the store evaluation and convenience into consideration. In one embodiment, the explicit data 31 includes the contents of Table 2:

TABLE 2

| store | evaluation | cash payment | employee card consumption | business hours | location | convenience | satisfaction |
|---|---|---|---|---|---|---|---|
| 7-11 | 4 | Yes | Yes | whole day | food court | 4 | 3 |
| MOS | 3.5 | No | m | morning | food court | 3 | 4 |

In one embodiment, the explicit data 31 includes the contents of Table 3:

TABLE 3

| store | employee ID | distance from the store | nearby stores | location |
|---|---|---|---|---|
| 7-11 | 95031327 | 200 m | bookstore | south building |
| MOS | 95031327 | 400 m | fruit and vegetable bar | north building |

Since the distance between the consumer and the store also affects the personal willingness to consume, and the neighboring store of this store may also affect the personal propensity to consume. Therefore, the explicit data 31 may also contain the contents of Table 3.

In addition, the environmental data collection module 12 or the processor 20 also determines the positive and negative evaluation of the digital text data 34 (such as the text message of the community web site and the content of the reply message). This differs from explicit data 31 in that these texts do not have certain rules, and the correct content cannot be obtained through text interception. In addition, these texts may contain some fake news, and the amount of digital text data 34 is huge. These texts are difficult to manually determine one by one or one sentence by one sentence. Therefore, these texts use artificial intelligence algorithms (such as the second neural network model) to determine the correctness of the data, and then classify the text messages to calculate the positive and negative evaluation of the store, and finds the store type that has the higher discussion popularity. The processor 20 also calculates the correlation between the store type and the product type 37 (for example, the processor 20 divides the number of articles containing a specific product by the total number of articles on a specific topic).

In addition, the picture material 36 can assist in defining popular product types 37 (such as coffee) and store types (such as convenience store), and so on.

In the era of artificial intelligence, due to the complexity of external environmental factors, the amount of data is huge and messy. Data collection can no longer rely on manual maintenance. Therefore, through the above environment data collection method 300, by applying artificial intelligence algorithms (such as the second neural network model) to analyze the data can achieve efficient data collection.

In one embodiment, the historical consumption record can be obtained by the consumption record module 14 or the processor 20. In one embodiment, the consumption records collected by the consumption record module 14 or the processor 20 can be regarded as historical consumption records. The consumption record module 14 or the processor 20 counts statistics according to consumption records, calculates the consumer's consumption amount, frequency of consumption, average customer unit price by year, month, and day, and ranking by year, month, and day. Consumption record is a good tool for predicting the number of guests. The average customer unit price is low, which may increase the number of guests. When the average customer unit price is low, the number of guests will increase, and when the average customer unit price is high, the number of guests will be reduced, but the total turnover may maintain in a certain level. In one embodiment, the historical consumption record includes the contents of Table 4:

TABLE 4

| store | employee ID | daily sales amount | average daily customer's cost | daily consumption times | daily ranking |
|---|---|---|---|---|---|
| 7-11 | 95031327 | 200 | 50 | 4 | 1 |
| MOS | 95031327 | 80 | 40 | 2 | 2 |

Product type 37 is another factor that determines personal preference. Vegetarians tend to eat healthy meals and vegetarian meals. Those who do not eat beef will choose an entree of pork or lamb. Statistics for the amount of each product type 37 can be summed and ranked by year and month to calculate the ranking and the monthly sales amount. The processor 20 can also calculate the number of consumption days in a month according to the number of visits. In one embodiment, the historical consumption record includes the contents of Table 5:

TABLE 5

| product type | type | employee ID | monthly consumption | monthly ranking | number of consumption days in a month |
|---|---|---|---|---|---|
| vegetarian food | main meal | 95031327 | 0 | 4 | 0 |
| pork main meal | main meal | 95031327 | 600 | 1 | 12 |
| beef main meal | main meal | 95031327 | 100 | 3 | 2 |
| chicken main meal | main meal | 95031327 | 400 | 2 | 8 |
| coffee | side meal | 95031327 | 1100 | 1 | 22 |
| fruit | side meal | 95031327 | 700 | 1 | 14 |

In one embodiment, the historical consumption record includes the contents of Table 6:

TABLE 6

| employee ID | working days | overtime hours in this month | job title | working type | 年齡 | 健身房 次數 |
|---|---|---|---|---|---|---|
| 95031327 | 22 | 8 | engineer | work in shifts | 30 | 0 |

TABLE 6-continued

| employee ID | working days | overtime hours in this month | job title | working type | 年齡 | 健身房 次數 |
|---|---|---|---|---|---|---|
| 94080824 | 20 | 16 | manager | normal type | 40 | 6 |

Historical consumption records can include background information about mobile payment personnel, such as age, job title, working type, etc. If some employees belong to the type of working in shifts, some employees belong to the type of often working overtime, some employees belong to the type of taking time off at a specific time, etc., the processor 20 can group consumers according to these data.

Figure 4:
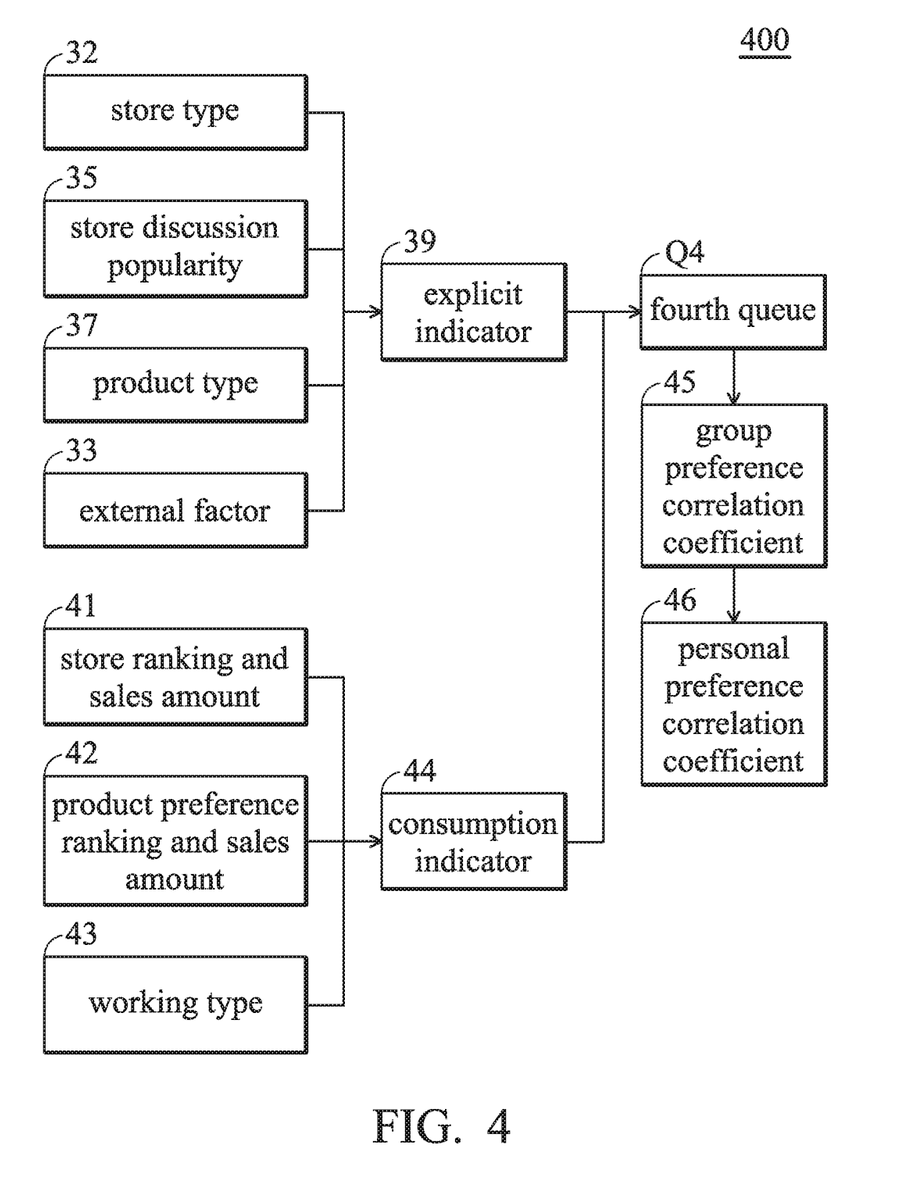
FIG. 4 is a flowchart of a consumer group classification method 400 in accordance with one embodiment of the present disclosure.

Please refer to FIG. 4, FIG. 4 is a flowchart of a consumer group classification method 400 in accordance with one embodiment of the present disclosure.

In one embodiment, store type 32, external factors 33, store-discussion popularity 35, and product type 37 are included in an explicit indicator 39.

In an embodiment, the processor 20 can obtain the store ranking and sales amount 41 (e.g., daily sales amount) through Table 4, the product preference ranking and sales amount 42 (e.g., monthly consumption) through the monthly ranking in Table 5, and the working type 43 through the job titles in Table 6.

In one embodiment, a consumption indicator 44 includes a store ranking and sales amount 41, a product preference ranking and sales amount 42 and a working type 43.

In one embodiment, the consumption group classification module 16 or the processor may record the explicit indicator 39 and the consumption indicator 44 in the fourth queue Q4.

In one embodiment, the training model is stored in the storage device 10. In one embodiment, the first queue Q1, the second queue Q2, the third queue Q3, and the fourth column Q4 are stored in the storage device 10.

In one embodiment, the consumer group classification module 16 or the processor calculates a group preference correlation coefficient 45 according to the explicit indicator 39 or the consumption indicator 44 and classifies the consumer according to the group preference correlation coefficient 45 and the personal preference correlation coefficient 46.

In one embodiment, the consumption group classification module 16 or the processor can read the explicit indicator 39 and the consumption indicator 44 from the fourth queue Q4 and calculate the group preference correlation coefficient 45. The group preference correlation coefficient 45 is calculated as follows:

$$GAR_{et} = \frac{\sum_{t=1}^{n} R_{et}}{n}$$

The symbol t represents the time interval, such as 7, 15, 30, 60 days . . . etc. The symbol n represents the amount of consumption in all stores at each time point. The symbol e can represent the store, the product type, whether the weather is good or bad, the discussion popularity—whether high, medium or low—and so on. The symbol Ret represents the number of personal store consumptions of the group at each time point. The symbol GARet is the preference coefficient of the group consumption (i.e. the group preference correlation coefficient 45).

The group preference correlation coefficient 45 can be divided into store consumption preference, product type purchase preference, good or bad weather, or the high or low discussion popularity of the preference indicator for discussion, etc. The processor 20 substitutes the relevant values into the group preference correlation coefficient formula. In addition, the processor 20 can calculate the correlation coefficient of the consumption indicator 44 and the correlation coefficient of the explicit indicator 39. Another use of the group preference correlation coefficient 45 is to modify the definition of group members, such as those that are susceptible to outside weather group factors can be included in the weather group. According to the calculation results, if it is found that the reference group (pre-defined group) is not highly correlated with the weather-related group preference coefficients, for example, regardless of the weather, the number of boxed lunches sold in stores is within a certain time interval, the group members should be corrected according to the personal preference correlation coefficient. The personal preference correlation coefficient has been described in step 210, so it will not be repeated herein.

After the consumer group classification module 16 or the processor 20 calculates the correlation coefficient (personal preference correlation coefficient) between the person and the reference group, the consumer group classification module 16 or the processor 20 can determine the degree of the correlation coefficient between the personal and the reference group. For example, when the personal preference correlation coefficient is high (such as personal preference for vegetarian food, when the monthly consumption amount of vegetarian food is used as a parameter input into the personal preference correlation coefficient formula, the result of the personal preference correlation coefficient will be higher than the substitution of the monthly consumption amount of lamb entrees into the personal preference correlation coefficient formula, which means that there is a high correlation between the person and the reference group (for example, the vegetarian group). If there is a high correlation with other reference groups, the representative should be reclassified to another group. If the person is highly related to other reference groups, the representative should be reclassified to another group. The correlation coefficient indicator between the person and the reference group can be obtained by the following formula:

$$PR_{eg} = \left(\frac{PAR_{et}}{GAR_{et}}\right)$$

The symbol g represents the group type. The symbol PARet represents the personal preference coefficient. The symbol GARet is the preference coefficient of each reference group. The symbol t represents the time interval, such as 7, 15, 30, 60 days, etc., the symbol e represents the store, product type, whether the weather is good or bad, or the discussion popularity—whether high, medium, or low—of the store, and so on. The symbol PReg is the correlation coefficient indicator between the person and the reference group. The larger the value is, the more relevant is. In this way, a variety of consumer groups can be classified.

In step 230, the processor 20 determines whether an accuracy rate of the training model is higher than a training threshold.

When the accuracy of the training model is higher than the training threshold, the processor 20 treats the training model as a prediction model.

When the accuracy of the training model is not higher than the training threshold, the processor 20 executes step 220 to input the personal preference correlation coefficient, more historical environment data and historical consumption records into the first neural network model.

The result of the training model is to accurately predict the number of consumers visiting the store. Combining historical environment data, historical consumption records and consumption records, and personal preference correlation coefficients, there will definitely be omissions and missing values in the data, so fill in the missing value through calculating the average of personal background data and the attribute of the group. In one embodiment, the processor 20 further determines whether the personal preference correlation coefficient, environment data or historical consumption records include a missing value. When the processor determines that the personal preference correlation coefficient, historical environment data, or historical consumption records contain missing values (for example, weather data for a certain day is not collected), the processor 20 automatically fills in the missing values (for example, the average value is calculated from the weather data of two adjacent days).

In one embodiment, the number of records that each person consumes in the store may be uneven. The processor 20 balances the amount of data and increases or decreases the amount of data to ensure the accuracy of the model prediction.

In one embodiment, the processor 20 inputs training data into the training model to obtain a training result. The processor 20 compares the training result with a known result (such as historical environment data or historical consumption records) to calculate the accuracy of the training model.

In step 240, the processor 20 inputs a predicted environment data into the prediction model, and the prediction model outputs a prediction result based on the predicted environment data.

For example, the processor 20 inputs prediction environment data such as cloudy weather, special sale, a temperature of 26 degrees, a product type consisting of a pork entree, and a job title of engineer into the prediction model, and the prediction result output by the prediction model is 50 guests (predicted number of guests), turnover of 8,000 dollars (predicted turnover) and other predicted items (such as predicted consumption times, predicted ranking in the month . . . etc.).

In one embodiment, the prediction environment data may be part of the data included in the explicit indicator 39 and/or the consumption indicator 44.

In one embodiment, the prediction environment data can be regarded as data or conditional restrictions on which to predict a future time interval (e.g., one week). The prediction environment data includes, for example, date, weather, activity, temperature, store, evaluation, current payment, whether employee card consumption, business hours, location, convenience, satisfaction, employee ID or store location . . . etc.

In step 250, the processor 20 extracts a predicted guest number and a predicted turnover from the prediction result, compares the predicted guest number with an actual guest number to generate a guest correction weight, and compares the predicted turnover with an actual turnover to generate a turnover correction weight.

For example, if the predicted guest number of the prediction result is 50 guests (for example, predicting the number of guests next Wednesday), and the predicted turnover of the prediction result is 8,000 dollars (for example, predicting the turnover for next Wednesday), then the processor 20 compares the predicted guest number 50 with the actual guest number 75 (for example, the actual guest number is calculated after the actual settlement on the next Wednesday)(since 75 is 1.5 times the number of 50, and the number of guests is corrected by a guest correction weight of 1.5). The processor 20 compares the predicted turnover of 8,000 dollars with the actual turnover of 9,600 dollars (for example, the actual turnover after the actual settlement on the next Wednesday) (since 9600 is 1.2 times of 8000, the turnover correction weight is 1.2).

In step 260, the processor 20 determines whether the guest correction weight (e.g., 1.5) is higher than a guest weight threshold (e.g., 1.2) or the turnover correction weight (e.g., 1.2) is higher than a turnover weight threshold (e.g., 1.3).

In one embodiment, when the guest correction weight is higher than the guest weight threshold or the turnover correction weight is higher than the turnover weight threshold, step 220 is performed. The processor 20 inputs the historical environment data, the historical consumption record and the personal preference correlation coefficient into the first neural network model and adjusts the training model according to the guest correction weight and the turnover correction weight to update the training model.

In one embodiment, when the guest correction weight is not higher than the guest weight threshold or the turnover correction weight is higher than the turnover weight threshold, step 270 is performed.

In this example, the processor 20 determines that the guest correction weight (e.g., 1.5) is higher than the guest weight threshold (e.g., 1.2). Therefore, the processor 20 returns the guest correction weight to step 220. In some examples, the processor 20 sends the guest correction weight and the turnover correction weight to enter the step 220 together.

In one embodiment, the processor 20 can send the data of the same customer's consumption tendency on the day or/and the environmental data collected on the day to enter the step 220. The first neural network model in step 220 can obtain more information to adjust the training model.

In step 270, the prediction model outputs predicted guest number and predicted turnover.

In an embodiment, the processor 20 or prediction model can multiply the predicted guest number (for example, 50 people) by the guest correction weight (for example, 1.5) during the current prediction or the next prediction to obtain a guest correction result (for example, 75 people), and multiply predicted turnover (for example, 8000 dollars) by turning correction weight (for example, 1.2) during the current prediction or the next prediction to obtain a turnover correction result (for example, 9600 dollars).

In one embodiment, in the process of generating model predictions, it is not possible to find the best model at one time. It will repeat steps 210 to 230 of the consumption prediction method 200 to find the top ones with higher accuracy and the lowest error rate. Based on the prediction model, make predictions on the probability of a person coming to the store. The prediction model will finally obtain the recommended store and product rankings for person, and use this ranking data to predict the guest number within a time interval (such as a week), and correct it by weight according to daily business conditions and personal choices. The correct made the guest number and turnover within a week can be within the correct range. Such modified results can be fed back to the artificial intelligence model (i.e., back to step 220), and input data for model training are added together. In addition, the output of the prediction model can be multiplied by the weight to correct the predicted guest number.

It can be seen from the above that in the era of artificial intelligence, the amount of data is huge and complicated. The factors to be considered and the amount of data are complicated to accurately and efficiently predict data. Therefore, data collection can no longer rely on manual maintenance. The consumption prediction system and consumption prediction method shown in the present invention analyze a large amount of complicated data through a neural network model to generate a prediction model, and can use the prediction model to output the predicted guest number and the predicted turnover for a period of time in the future. The consumption prediction system and consumption prediction method can also compare the predicted guest number with the actual guest number to obtain the guest correction weight and compare the predicted turnover with the actual turnover to obtain the turnover correction weight. The prediction model can be adjusted through the guest correction weight and turnover correction weight to make the prediction model more accurate.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A consumption prediction system, comprising:
    a data storage device, configured to store historical environment data and a historical consumption record; and
    a processor, configured to:
    calculate a personal preference correlation coefficient;
    input the historical environment data, the historical consumption record and the personal preference correlation coefficient into a first neural network model; wherein the first neural network model is used to generate a training model;
    compare an accuracy rate of the training model to a training threshold;
    responsive to a determination that the accuracy rate of the training model is higher than the training threshold, regard the training model as a prediction model;
    input prediction environment data into the prediction model;
    output, using the prediction model, a prediction result based on the prediction environment data;
    extract a predicted guest number and a predicted turnover from the prediction result;
    compare the predicted guest number with an actual guest number to generate a guest correction weight;
    compare the predicted turnover with an actual turnover to generate a turnover correction weight;
    determine whether the guest correction weight is higher than a guest weight threshold or whether the turnover correction weight is higher than a turnover weight threshold;
    input the guest correction weight and the turnover correction weight into the first neural network model to adjust the training model according to the guest correction weight and the turnover correction weight in order to adjust the training model according to the guest correction weight and the turnover correction weight and update the training model, when the guest correction weight is higher than the guest weight threshold or the turnover correction weight is higher than the turnover weight threshold;
    receive explicit data and store the explicit data in a first queue;
    receive digital text data and store the digital text data in a second queue; and
    receive picture data and store the picture data in a third queue.

2. The consumption prediction system of claim 1, wherein the processor is further configured to add up the number of purchases by a consumer in a specific store in a time interval to obtain a total number of purchases by the consumer in the specific store, and divide the total number of purchases by the consumer in the specific store by the number of purchases by the consumer in all stores in the time interval to calculate the personal preference correlation coefficient.

3. The consumption prediction system of claim 1, wherein the processor is further configured to determine whether the personal preference correlation coefficient, the historical environment data or the historical consumption record comprise a missing value; and in response to a determination that the personal preference correlation coefficient, the historical environment data or the historical consumption record comprise a missing value, automatically fill in the missing value.

4. The consumption prediction system of claim 1, wherein the processor is further configured to input training data into the training model to obtain a training result; and compare the training result with a known result to calculate the accuracy rate of the training model.

5. The consumption prediction system of claim 1, wherein the processor is further configured to, in response to a determination, that the guest correction weight is not higher than the guest weight threshold and the turnover correction weight is not higher than the turnover weight threshold, multiply the predicted guest number by the guest correction weight to obtain a guest number correction result.

6. The consumption prediction system of claim 1, wherein the processor is further configured to:
    read the explicit data from the first queue and retrieve a text message in the explicit data wherein the text message is related to a store type and an external factor;
    read the digital text data from the second queue;
    use a second neural network model to classify the digital text data to obtain store-discussion popularity corresponding to the digital text data; wherein the processor reads out the picture data from the third queue, a third neural network model is used to classify the picture data to obtain a product type corresponding to the picture data, and the store type, the external factors, the store-discussion popularity, and the product type are included in an explicit indicator.

7. The consumption prediction system of claim 6, wherein the processor is further configured to: accept a consumption indicator, which includes a working type, a product preference ranking and sales amount, and a store ranking and sales amount;
    store the explicit indicator and the consumption indicator in a fourth queue;
    calculate a group preference correlation coefficient based on the explicit indicator or the consumption indicator; and classify a plurality of consumer groups based on the group preference correlation coefficient and the personal preference correlation coefficient.

8. A consumption prediction method, comprising:

calculating, using a processor, a personal preference correlation coefficient;

inputting, using the processor, historical environment data, a historical consumption record and the personal preference correlation coefficient into a first neural network model, wherein the first neural network model is used to generate a training model;

determining, using the processor, that an accuracy rate of the training model is higher than a training threshold in response to comparing the accuracy rate and the training threshold;

regarding the training model as a prediction model based on the determination that the accuracy rate of the training model is higher than the training threshold;

inputting, using the processor, prediction environment data into the prediction model to obtain a prediction result output from the prediction model based on the prediction environment data;

extracting, using the processor, a predicted guest number and a predicted turnover from the prediction result;

comparing, using the processor, the predicted guest number with an actual guest number to generate a guest correction weight;

comparing, using the processor, the predicted turnover with an actual turnover to generate a turnover correction weight;

determining, using the processor, that the guest correction weight is higher than a guest weight threshold or the turnover correction weight is higher than a turnover weight threshold in response to comparing the guest correction weight and the guest weight threshold and to comparing the turnover correction weight and the turnover weight threshold;

inputting, using the processor, the guest correction weight and the turnover correction weight into the first neural network model in order to adjust the training model according to the guest correction weight and the turnover correction weight to update the training model based on the determination that the guest correction weight is higher than the guest weight threshold or the turnover correction weight is higher than the turnover weight threshold;

receiving, using the processor, explicit data and storing the explicit data in a first queue;

receiving, using the processor, digital text data and storing the digital text data in a second queue; and receiving, using the processor, picture data and storing the picture data in a third queue.

9. The consumption prediction method of claim 8, further comprising:

determining, using the processor, that the guest correction weight is not higher than the guest weight threshold and the turnover correction weight is not higher than the turnover weight threshold; and multiplying, using the processor, the predicted guest number by the guest correction weight to obtain a guest number correction result in response to determining that the guest correction weight is not higher than the guest weight threshold and the turnover correction weight is not higher than the turnover weight threshold.

* * * * *